United States Patent
Watanabe et al.

(10) Patent No.: US 11,924,726 B2
(45) Date of Patent: Mar. 5, 2024

(54) IN-VEHICLE CONTROL DEVICE, INFORMATION PROCESSING DEVICE, VEHICLE NETWORK SYSTEM, METHOD OF PROVIDING APPLICATION PROGRAM, AND RECORDING MEDIUM WITH PROGRAM RECORDED THEREON

(71) Applicant: TOYOTA JIDOSHA KABUSHIKI KAISHA, Toyota (JP)

(72) Inventors: Isao Watanabe, Nagoya (JP); Kunihiro Miyauchi, Miyoshi (JP); Hiroya Andou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 710 days.

(21) Appl. No.: 17/007,034

(22) Filed: Aug. 31, 2020

(65) Prior Publication Data
US 2021/0084464 A1 Mar. 18, 2021

(30) Foreign Application Priority Data
Sep. 18, 2019 (JP) .................. 2019-169826

(51) Int. Cl.
H04W 4/48 (2018.01)
G06N 5/025 (2023.01)
H04L 12/40 (2006.01)

(52) U.S. Cl.
CPC ............. *H04W 4/48* (2018.02); *G06N 5/025* (2013.01); *H04L 12/40* (2013.01); *H04L 2012/40215* (2013.01); *H04L 2012/40273* (2013.01)

(58) Field of Classification Search
CPC ......... H04W 4/48; G06N 5/025; G06N 20/00; H04L 12/40; H04L 2012/40215;
(Continued)

(56) References Cited

U.S. PATENT DOCUMENTS

2013/0227689 A1* 8/2013 Pietrowicz .......... H04L 63/0254
726/23
2014/0297109 A1 10/2014 Shimomura et al.
(Continued)

FOREIGN PATENT DOCUMENTS

JP 2014-193654 A 10/2014
JP 2016-134914 A 7/2016
(Continued)

OTHER PUBLICATIONS

Fraida Fund, "Understanding the 802.11 Wireless LAN MAC frame format", published Mar. 20, 2017, retrieved from https://witestlab.poly.edu/blog/802-11-wireless-lan-2/ (Year: 2017).*
(Continued)

*Primary Examiner* — Calvin Cheung
(74) *Attorney, Agent, or Firm* — Oliff PLC

(57) ABSTRACT

An in-vehicle control device includes a vehicle-side communication unit installed on a vehicle and communicating with at least an information processing device external to the vehicle, and a first processor. The first processor is configured to: receive an installation request for an application program from the information processing device; in a case in which the installation request has been received, notify the information processing device of a rule defining whether or not a communication frame received at the vehicle-side communication unit is unauthorized and of equipment information related to optional equipment of the vehicle; acquire the application program and a rule that has been updated based on the notified rule and the equipment information from the information processing device; and, in a case in which the updated rule has been acquired, update the rule to the updated rule.

10 Claims, 10 Drawing Sheets

(58) Field of Classification Search
CPC ..... H04L 2012/40273; H04L 12/40026; H04L 67/12; H04L 63/1416; H04L 67/34
See application file for complete search history.

(56) References Cited

U.S. PATENT DOCUMENTS

| | | |
|---|---|---|
| 2016/0291940 A1* | 10/2016 | Searle .................. H04L 67/303 |
| 2017/0147812 A1 | 5/2017 | Ujiie et al. |
| 2018/0144119 A1* | 5/2018 | Kishikawa ........ H04L 12/40169 |
| 2019/0173912 A1 | 6/2019 | Ujiie et al. |
| 2019/0294783 A1 | 9/2019 | Ujiie et al. |
| 2019/0312895 A1 | 10/2019 | Fujimura et al. |

FOREIGN PATENT DOCUMENTS

| | | |
|---|---|---|
| JP | 2018-026791 A | 2/2018 |
| JP | 2018-111468 A | 7/2018 |

OTHER PUBLICATIONS

JP-2000207220-A with English translation. (Year: 2000).*

* cited by examiner

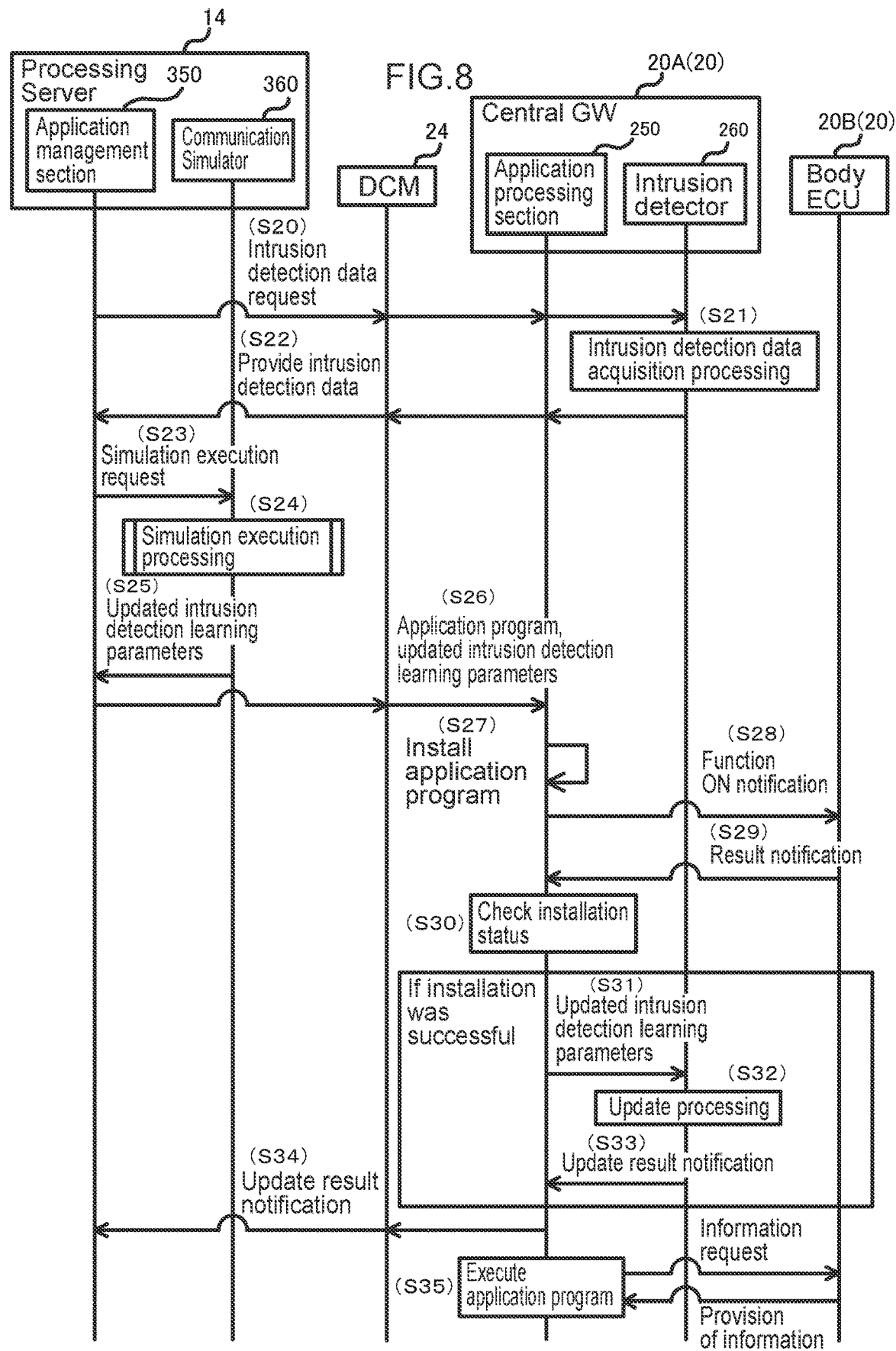

FIG.9

| No. | Data content | |
|---|---|---|
| 1 | Intrusion detection version | |
| 2 | Intrusion detection target frame | |
| | 1 | Frame ID |
| | 2 | Data frame contents (Inspection target value) |
| | 3 | Frame reception cycle |
| | 4 | Reception cycle error |
| | 5 | Message authentication identifier (MAC) |
| 3 | Routing map (Showing the relay route of communication) | |
| 4 | Intrusion detection learning parameters | |
| | 1 | Relationship between frames (Example: A frame reception ⇒ B frame reception order, etc.) |
| | 2 | Data frame contents (Example: Abnormal data value, etc.) |

IN-VEHICLE CONTROL DEVICE, INFORMATION PROCESSING DEVICE, VEHICLE NETWORK SYSTEM, METHOD OF PROVIDING APPLICATION PROGRAM, AND RECORDING MEDIUM WITH PROGRAM RECORDED THEREON

CROSS-REFERENCE TO RELATED APPLICATION

This application is based on and claims priority under 35 USC 119 from Japanese Patent Application No. 2019-169826 filed on Sep. 18, 2019, the disclosure of which is incorporated by reference herein.

BACKGROUND

Technical Field

The present disclosure relates to a vehicle-mounted (in-vehicle) control device, an information processing device, a vehicle network system, a method of providing an application program, and a recording medium on which a program is recorded.

Related Art

Japanese Patent Application Laid-Open No. 2016-134914 discloses a fraud detection rule update method in which a fraud detection rule for detecting fraud in an in-vehicle network system is updated by an update fraud detection rule distributed and received from a server outside the vehicle.

On the other hand, it is assumed that a vehicle that supports Mobility as a Service downloads an application program from an external server and operates the application program. Therefore, if the communication environment changes due to the installation of the application program, intrusion detection in communication may cause a malfunction.

Therefore, if a fraud detection rule unilaterally distributed from a server outside the vehicle is used as in the in-vehicle network system disclosed in Japanese Patent Application Laid-Open No. 2016-134914, intrusion detection may malfunction due to the installation of the application program.

SUMMARY

The present disclosure aims to provide an in-vehicle control device, an information processing device, a vehicle network system, a method of providing an application program, and a recording medium storing a program, that suppress malfunction of intrusion detection even when a communication environment in a vehicle is changed by installing an application program.

A first aspect is an in-vehicle control device which includes a vehicle-side communication unit, a receiver unit, a notification unit, an acquisition unit, and an update unit. The vehicle-side communication unit is installed on the vehicle and communicates with at least an information processing device external to the vehicle. The receiver unit receives an application program installation request from the information processing device. The notification unit, when the receiver unit receives the installation request, notifies the information processing device of a rule defining whether or not a communication frame received by the vehicle-side communication unit is unauthorized, and of equipment information related to optional equipment of the vehicle. The acquisition unit acquires a rule that has been updated based on the notified rule and equipment information, together with the application program, from the information processing device. The update unit updates the rule to the updated rule when the acquisition unit has acquired the updated rule.

The in-vehicle control device according to the first aspect is installed on a vehicle and enables installation of an application program provided from an information processing device. The in-vehicle control device performs intrusion detection in the vehicle-side communication unit based on a rule that defines whether or not a communication frame is unauthorized. Further, in the in-vehicle control device, when the receiver unit has received the application program installation request, the notification unit notifies the information processing device of the rule relating to the communication frame and of the equipment information relating to the optional equipment of the vehicle. Accordingly, in the information processing device, the rule is updated based on the notified rule and equipment information. Further, in the in-vehicle control device, the acquisition unit acquires the updated rule and the application program from the information processing device, and the update unit updates the rule related to the communication frame in conjunction with the installation of the application program.

The in-vehicle control device according to the first aspect notifies an information processing device, which is a source of an application program, of a rule that affects the communication environment, that is, a rule related to a communication frame, and of equipment information related to optional equipment of a vehicle. Thereby, the rule is updated according to the new communication environment. Therefore, according to the in-vehicle control device, it is possible to suppress malfunctioning of intrusion detection even if the communication environment in the vehicle is changed by installing the application program.

A second aspect is an information processing device which includes an extravehicular communication unit, a request unit, a collection unit, a generation unit, and a provision unit. The extravehicular communication unit communicates with a vehicle-side communication unit provided at an in-vehicle control device installed on a vehicle. The request unit issues a request to install the application program to the in-vehicle control device. The collection unit collects, from the in-vehicle control device to which the installation request has been made, a rule that defines whether or not a communication frame received by the vehicle-side communication unit is unauthorized and equipment information related to optional equipment of the vehicle. The generation unit generates a rule that has been updated based on the rule and the equipment information collected by the collection unit. The provision unit provides the application program and the updated rule generated by the generation unit to the in-vehicle control device.

In the information processing device according to the second aspect, the application program can be provided to the in-vehicle control device installed on the vehicle. Further, the in-vehicle control device performs intrusion detection in the vehicle-side communication unit based on a rule that defines whether or not a communication frame is unauthorized. In the information processing device, the request unit issues a request to install the application program to the in-vehicle control device, and the collection unit collects the rule related to the communication frame and equipment information related to optional equipment of the vehicle. Further, in the information processing device, the generation unit generates an updated rule based on the collected rule and the equipment information, and the provision unit provides the updated rule and the application program to the in-vehicle control device.

The information processing device according to the second aspect collects, from the in-vehicle control device, a rule that affects the communication environment, that is, a rule related to a communication frame, and equipment information related to optional equipment of the vehicle, and updates, and provides to the in-vehicle control device, the rule collected in conjunction with a new communication environment. Therefore, according to the information processing device, it is possible to suppress malfunctioning of intrusion detection even if the communication environment in the vehicle is changed by installing the application program.

A third aspect is a vehicle network system including the in-vehicle control device according to the first aspect, and an information processing device that communicates with the vehicle-side communication unit. The information processing device includes a request unit, a collection unit, a generation unit, and a provision unit. The request unit makes the installation request to the in-vehicle control device. The collection unit collects the rule and the equipment information from the in-vehicle control device to which the installation request has been made. The generation unit generates a rule that has been updated based on the rule and the equipment information collected by the collection unit. The provision unit provides the application program and the updated rule generated by the generation unit to the in-vehicle control device.

In the vehicle network system according to the third aspect, the application program can be provided from the information processing device external to the vehicle to the in-vehicle control device installed on the vehicle. Further, the in-vehicle control device performs intrusion detection in the vehicle-side communication unit based on a rule that defines whether or not a communication frame is unauthorized. In the information processing device, the request unit issues a request to install the application program to the in-vehicle control device, and at the in-vehicle control device, in accordance with this request, the notification unit provides notification of the rule related to the communication frame and equipment information related to optional equipment of the vehicle. Further, in the information processing device, the generation unit generates an updated rule based on the collected rule and the equipment information, and the provision unit provides the updated rule and the application program to the in-vehicle control device. Further, in the in-vehicle control device, the acquisition unit acquires the updated rule and the application program from the information processing device, and the update unit updates the rule related to the communication frame in conjunction with the installation of the application program.

In the vehicle network system according to the third aspect, an in-vehicle control device notifies an information processing device, which is a source of an application program, of a rule that affects the communication environment, that is, a rule related to a communication frame, and of equipment information related to optional equipment of a vehicle. Further, the information processing device updates the rule according to the new communication environment based on the collected rule and equipment information, and provides the updated rule to the in-vehicle control device. As described above, according to the vehicle network system, it is possible to suppress malfunctioning of intrusion detection even if the communication environment in the vehicle is changed by installing the application program.

The vehicle network system according to a fourth aspect is the vehicle network system according to the third aspect, in which the in-vehicle control device further includes an execution unit that executes the installed application program acquired by the acquisition unit, and the execution unit executes the application program after the update unit updates to the updated rule.

In the vehicle network system according to the fourth aspect, the application program is executed in the in-vehicle control device after the rule has been updated. Therefore, according to the vehicle network system, a communication frame that changes when the in-vehicle control device executes the application program can be determined to be appropriate due to the updated rule.

A fifth aspect is a method of providing an application program, in which the application program is provided from an information processing device external to a vehicle to an in-vehicle control device installed on the vehicle. The method of providing an application program includes a requesting step, a notifying step, a generating step, a providing step, an installing step, an updating step, and an executing step. In the requesting step, a request to install the application program is made from the information processing device to the in-vehicle control device. The notifying step provides notification of a rule that defines whether or not a communication frame received at a communication unit provided at the in-vehicle control device is unauthorized, and of equipment information related to optional equipment of the vehicle, from the in-vehicle control device that has received the installation request to the information processing device. The generating step generates a rule that is updated based on the rule and the equipment information acquired by the information processing device. The providing step provides the application program and the updated rule from the information processing device to the in-vehicle control device. The installing step installs the application program in a case in which the in-vehicle control device has acquired the application program. The updating step updates the rule to the updated rule in a case in which the updated rule has been acquired by the in-vehicle control device. The executing step executes the application program after the update to the updated rule has been performed.

In the method of providing an application program according to the fifth aspect, an in-vehicle control device notifies an information processing device, which is a source of an application program, of a rule that affects the communication environment, that is, a rule related to a communication frame, and of equipment information related to optional equipment of a vehicle. Further, the information processing device updates the rule according to the new communication environment based on the collected rule and equipment information, and provides the updated rule to the in-vehicle control device. Therefore, according to the method of providing an application program, it is possible to suppress malfunctioning of intrusion detection even if the communication environment in the vehicle is changed by installing the application program. In addition, since the application program is executed after the rules are updated in the in-vehicle control device, it is possible to determine that a communication frame that changes due to the execution of the application program by the in-vehicle control device is appropriate due to the updated rules.

A sixth aspect is a non-transitory storage medium storing a program according to which an in-vehicle control device, installed at a vehicle and performing communication with at least an information processing device external to the vehicle, receives a provided application program. The program stored on the recording medium causes a computer to execute processing including a receiving step, a notifying step, an acquiring step, and an updating step. In the receiving step, an application program installation request is received from the information processing device. In the notifying step, in a case in which the installation request has been received, the information processing device is notified of a rule defining whether or not a communication frame received by a communication unit provided at the in-vehicle control device is unauthorized, and of equipment information related to optional equipment of the vehicle. In the acquiring step, a rule that has been updated based on the notified rule and equipment information, together with the application program, is acquired from the information processing device. In the updating step, the rule is updated to the updated rule in a case in which the updated rule has been acquired by the in-vehicle control device.

In the sixth aspect, a program for causing a computer to execute each processing in an in-vehicle control device is recorded on a non-transitory recording medium. The program executes processing that notifies an information processing device, which is a source of an application program, of a rule that affects the communication environment, that is, a rule related to a communication frame, and of equipment information related to optional equipment of a vehicle. Thereby, the rule is updated according to the new communication environment. Therefore, according to the program, it is possible to suppress malfunctioning of intrusion detection even if the communication environment in the vehicle is changed by installing the application program.

A seventh aspect is a non-transitory recording medium storing a program according to which an extravehicular information processing device provides an application program to an in-vehicle control device installed on a vehicle. The program stored on the recording medium causes a computer to execute processing including a requesting step, a collection step, a generation step, and a provision step. In the requesting step, a request to install the application program is made to the in-vehicle control device. In the collection step, a rule that defines whether or not a communication frame received by a communication unit provided at the in-vehicle control device is unauthorized, and equipment information related to optional equipment of the vehicle, are collected from the in-vehicle control device to which the installation request has been made. In the generation step, an updated rule is generated based on the collected rules and the equipment information. In the provision step, the application program and the updated rule are provided to the in-vehicle control device.

In the seventh aspect, a program for causing a computer to execute processing in an information processing device is recorded on a non-transitory recording medium. The program performs processing to collect, from the in-vehicle control device, a rule that affects the communication environment, that is, a rule related to a communication frame, and equipment information related to optional equipment of the vehicle, and to update, and provide to the in-vehicle control device, the rule collected in conjunction with a new communication environment. Therefore, according to the program, it is possible to suppress malfunctioning of intrusion detection even if the communication environment in the vehicle is changed by installing the application program.

Therefore, according to the present disclosure, it is possible to suppress malfunctioning of intrusion detection even if the communication environment in the vehicle is changed by installing the application program.

BRIEF DESCRIPTION OF THE DRAWINGS

Exemplary embodiments of the present disclosure will be described in detail based on the following figures, wherein:

FIG. 8 is a sequence diagram showing a flow of processing for distributing an application program in the first embodiment;

FIG. 9 is a diagram showing a configuration of intrusion detection data according to the first embodiment.

DETAILED DESCRIPTION

First Embodiment

Figure 1:
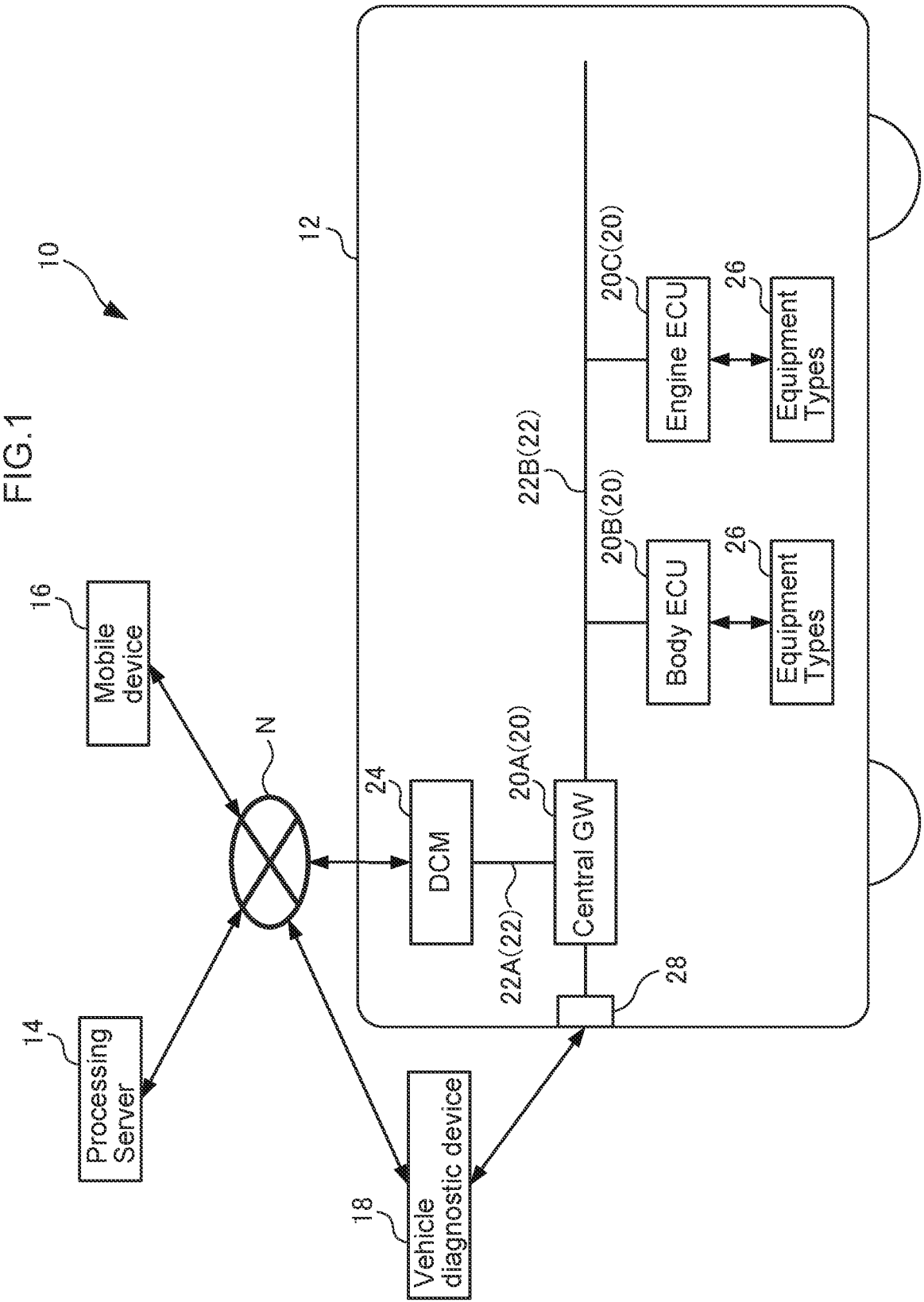
FIG. 1 is a diagram showing a schematic configuration of a vehicle network system according to a first embodiment.

FIG. 1 is a block diagram showing a schematic configuration of a vehicle network system 10 according to a first embodiment.

(Outline)

As shown in FIG. 1, the vehicle network system 10 according to the first embodiment includes a vehicle 12, a processing server 14 as an information processing device, a portable terminal (mobile device) 16, and a vehicle diagnostic device 18.

The vehicle 12 of the present embodiment includes a plurality of ECUs 20 and a DCM 24. The ECU 20 has at least a central GW 20A, a body ECU 20B, and an engine ECU 20C. ECU means Electronic Control Unit, DCM means Data Communication Module, and central GW means Central Gateway. Central GW 20A is an example of a vehicle-mounted control device.

ECU 20 and DCM 24 are respectively connected via an external bus 22 for communication. The external bus 22 has a first bus 22A that connects the central GW 20A and the DCM 24, and a second bus 22B that interconnects the central GW 20A, the body ECU 20B, and the engine ECU 20C. In the external bus 22, communication according to the CAN protocol is performed. Note that the communication method of the external bus 22 is not limited to CAN, and CAN-FD, Ethernet (registered trademark), or the like may be applied. CAN means Controller Area Network, and CAN-FD means Controller Area Network With Flexible Data Rate.

Each ECU 20 is connected to devices 26 required for controlling the vehicle or constituting the vehicle. Note that the ECU 20 connected to the central GW 20A via the second bus 22B is not limited to the body ECU 20B and the engine ECU 20C, but can be connected to various ECUs such as a transmission ECU, a meter ECU, a multimedia ECU, and a smart key ECU.

In addition, Central GW 20A is connected to DLC 28. This DLC 28 can be connected to the vehicle diagnostic device 18, which is a diagnostic tool. DLC stands for Data Link Connector.

In the vehicle network system 10, the DCM 24 of the vehicle 12, the processing server 14, the portable terminal 16, and the vehicle diagnostic device 18 are mutually connected via a network N. The network N is a wireless communication network, and uses communication standards such as 5G, LTE, and Wi-Fi (registered trademark).

The mobile device 16 is a communication device such as a smartphone or a tablet terminal.

(ECU)

Figure 2:
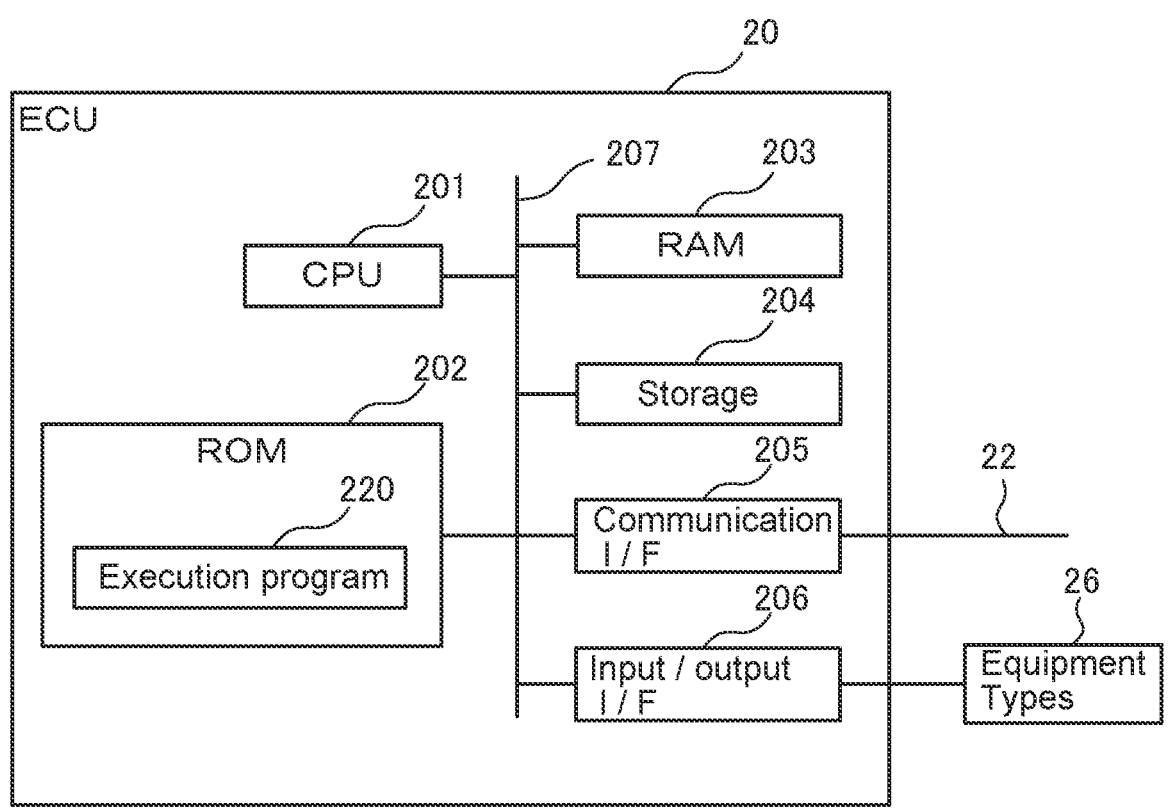
FIG. 2 is a block diagram illustrating a hardware configuration of an ECU according to the first embodiment.

As shown in FIG. 2, the ECU 20 includes a CPU 201, a ROM 202, a RAM 203, a storage 204, a communication I/F 205, and an input/output I/F 206. CPU means Central Processing Unit, ROM means Read Only Memory, RAM means Random Access Memory, and I/F means Interface. The CPU 201, the ROM 202, the RAM 203, the storage 204, the communication I/F 205, and the input/output I/F 206 are communicably connected to each other via an internal bus 207. The CPU 201 is an example of a first processor.

The CPU 201 is a central computation processing unit that executes various programs and controls the respective units. Namely, the CPU 201 reads a program from the ROM 202, and executes the program employing the RAM 203 as a workspace. In the present exemplary embodiment, an execution program 220 is stored in the ROM 202.

The ROM 202 stores various programs and various data. The RAM 203 acts as a workspace for temporary storage of programs and data.

The storage 204 is configured by a Hard Disk Drive or a Solid State Drive, and stores data relating to intrusion detection rules and intrusion detection learning parameters, which are described below, and intrusion detection data referenced in FIG. 9. It is desirable that each component included in the ECU 20, such as the ROM 202 and the storage 204, be a tamper-resistant medium such as a Hardware security module.

The communication I/F 205 is an interface for connecting to the DCM 24 and another ECU 20. The interface uses a communication standard based on the CAN protocol. The communication I/F 205 is connected to the external bus 22. The communication I/F 205 is a communication unit at the vehicle 12 side, and is an example of a vehicle-side communication unit.

The input/output I/F 206 is an interface for communication with the devices 26 installed on the vehicle 12.

Figure 3:
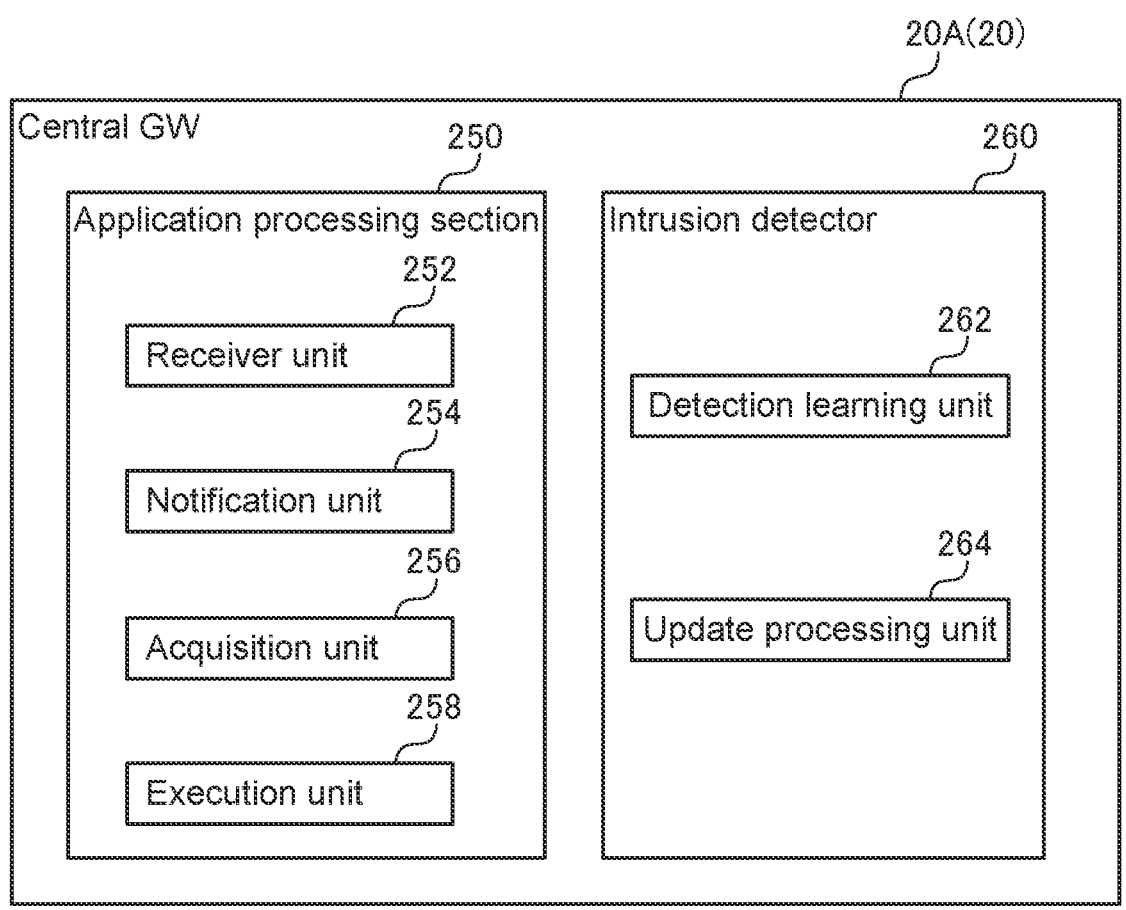
FIG. 3 is a block diagram illustrating an example of a functional configuration of the central GW according to the first embodiment.

FIG. 3 is a block diagram illustrating an example of the functional configuration of the central GW 20A. As shown in FIG. 3, the central GW 20A has an application processing section 250 and an intrusion detector 260. Further, the application processing section 250 includes a receiver unit 252, a notification unit 254, an acquisition unit 256, and an execution unit 258, and the intrusion detector 260 includes a detection learning unit 262 and an update processing unit 264. Each functional configuration is implemented by the CPU 201 reading and executing the execution program stored in the ROM 202.

The application processing section 250 has a function of performing processing related to installation and execution of the application program 320.

The receiver unit 252 has a function of receiving a request to install the application program 320 from the processing server 14.

The notification unit 254 has a function of notifying the processing server 14 of intrusion detection learning parameters in which intrusion detection rules are defined and of equipment information relating to optional equipment of the vehicle 12, when the receiver unit 252 receives an installation request. The intrusion detection rule is a rule for determining whether or not a CAN communication frame received by the communication I/F 205 is illegal. The intrusion detection rule can establish a frame ID for communication arbitration in the CAN protocol, data frame content, a frame reception cycle, a reception cycle error, Message Authentication Code (MAC) or the like. In the following description, the frame ID is simply referred to as an "ID". The intrusion detection learning parameter is information that defines the relationship between individual data frames, and the applied intrusion detection rule. The intrusion detection learning parameter of the present embodiment is an example of a rule in the present disclosure.

Here, an example of an intrusion detection rule applied when receiving a communication frame related to a traveling distance is described. When defining the order of data frames based on an ID, it is possible to define an intrusion detection rule that receives a frame A related to an ID1 and then receives a frame B related to an ID3 and then a frame C related to an ID4. When the range of IDs is defined, for example, an intrusion detection rule including only ID1, ID3, and ID4 can be defined for a certain communication frame.

Further, when the content of the data frame is defined, for example, when a communication frame related to the travel distance is received, the intrusion detection rule can specify that the total travel distance of the odometer obtained from the data table increases over time. In this case, if the total traveling distance decreases over time, the intrusion detector 260 determines that the communication frame is an invalid communication frame.

The acquisition unit 256 has a function of acquiring the updated intrusion detection learning parameters and the application program 320 from the processing server 14. Here, the updated intrusion detection learning parameter is difference data generated based on the intrusion detection learning parameter notified by the notification unit 254 and the equipment information.

The execution unit 258 has a function of executing the installed application program 320. The execution unit 258 is configured to execute the application program 320 after the update processing unit 264, which is described later, updates the intrusion detection learning parameter.

The intrusion detector 260 has a function of detecting an unauthorized access to the communication I/F 205 and a function of storing the unauthorized access.

Upon receiving a communication frame based on the CAN protocol from the communication I/F 205, the detection learning unit 262 has a function of determining whether or not there is an intrusion that is an unauthorized access, and storing the access if it is an unauthorized intrusion. When the communication frame has been received, the detection learning unit 262 performs a detection learning processing, which is described below, with reference to the intrusion detection rule defined in the intrusion detection learning parameter. Further, the detection learning unit 262 has a function of updating the intrusion detection learning parameter.

When the acquisition unit 256 acquires the updated intrusion detection learning parameter, the update processing unit 264, which is an updating unit, has a function of updating the intrusion detection learning parameter from before installing the application program 320 to the updated intrusion detection learning parameter.

(Processing Server)

Figure 4:
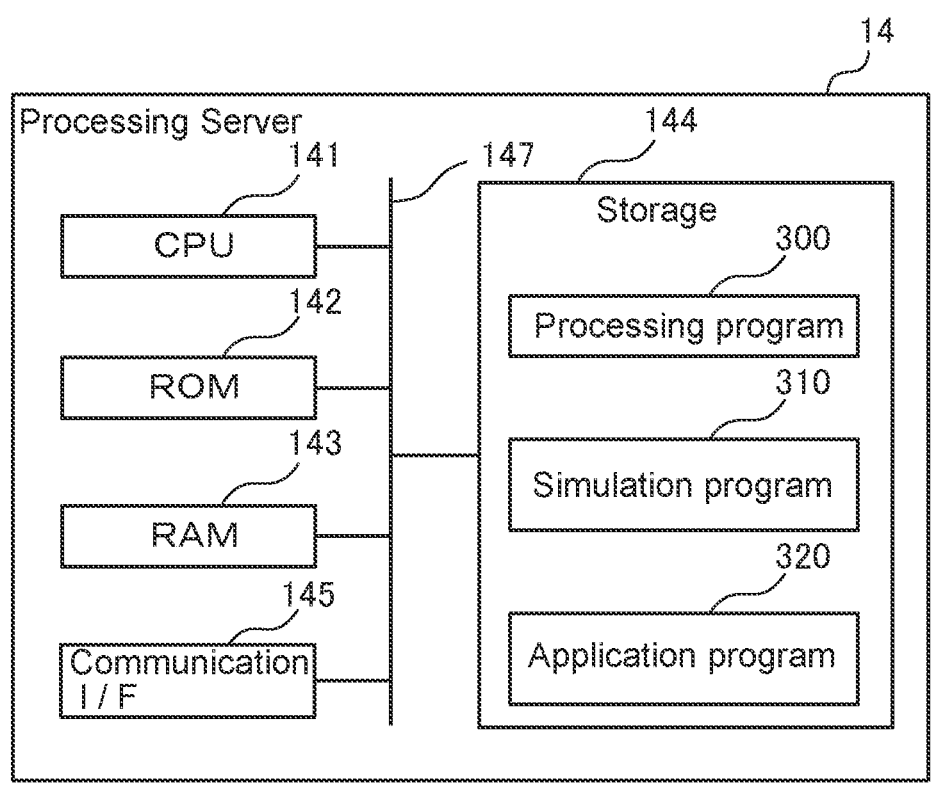
FIG. 4 is a block diagram illustrating a hardware configuration of the processing server of the first embodiment.

FIG. 4 is a block diagram illustrating a hardware configuration of devices installed at the processing server 14 of the present exemplary embodiment.

The processing server 14 includes a CPU 141, a ROM 142, a RAM 143, a storage 144, and a communication I/F 145. The CPU 141, the ROM 142, the RAM 143, the storage 144, and the communication I/F 145 are communicably connected to each other via an internal bus 147. The functions of the CPU 141, the ROM 142, the RAM 143, and the storage 144 are the same as those of the CPU 201, the ROM 202, the RAM 203, and the storage 204 of the ECU 20 described above. The CPU 141 is an example of a second processor.

In the storage 144 of the present embodiment, a processing program 300, a simulation program 310, and an application program 320 are stored. The simulation program 310 is a program for performing simulation execution processing, which is described later. The application program 320 is a program that is installed and executed at the central GW 20A.

The communication I/F 145 is an interface for connecting to the network N, and uses communication standards such as 5G, LTE, and Wi-Fi (registered trademark). The communication I/F 145 is a communication unit at a side of the processing server 14, and is an example of an extravehicular communication unit.

The CPU 141 according to the present embodiment reads the processing program 300 from the ROM 142 and executes the processing program 300 using the RAM 143 as a work area. When the CPU 141 executes the processing program 300, the processing server 14 functions as the application management unit 350 and the communication simulation unit 360 illustrated in FIG. 5.

Figure 5:
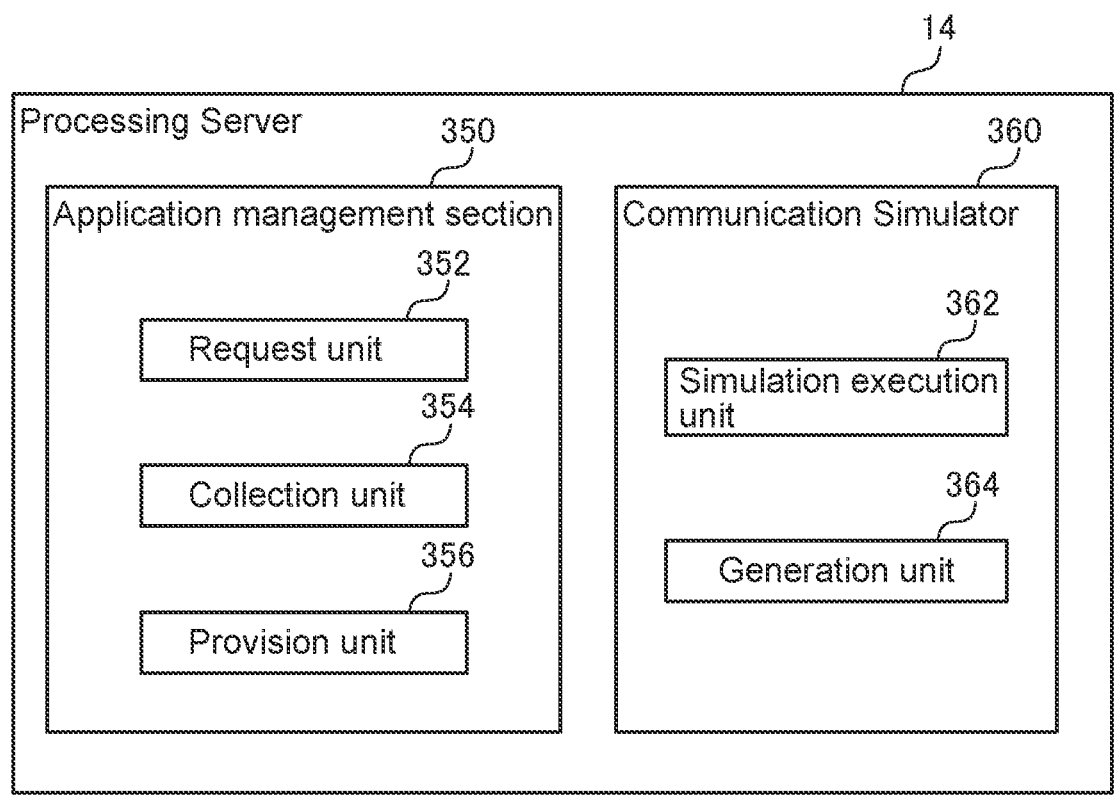
FIG. 5 is a block diagram illustrating an example of a functional configuration of the processing server according to the first embodiment.

FIG. 5 is a block diagram illustrating an example of the functional configuration of the processing server 14. As shown in FIG. 5, the processing server 14 has an application management section 350 and a communication simulator 360. The application management section 350 includes a request unit 352, a collection unit 354, and a provision unit 356, and the communication simulator 360 includes a simulation execution unit 362 and a generation unit 364.

The application management section 350 has a function of managing the application program 320 to be installed at the central GW 20A. Further, the application management section 350 has a function of transmitting and receiving information to and from the central GW 20A of the vehicle 12.

The request unit 352 has a function of making a request to install the application program 320 to the central GW 20A. The request unit 352 issues an installation request when installation is accepted by a mobile device 16 owned by a user.

The collection unit 354 has a function of collecting intrusion detection learning parameters in the central GW 20A and equipment information on optional equipment of the vehicle 12 from the central GW 20A to which the installation request has been issued.

The provision unit 356 has a function of providing the updated intrusion detection learning parameters generated by the application program 320 and a generation unit 364, which is described later, to the central GW 20A.

The communication simulator 360 has a function of performing a simulation simulating the communication environment in the vehicle 12.

The simulation execution unit 362 has a function of performing simulation execution processing, which is described later. In the simulation execution processing, the simulation execution unit 362 executes the simulation program 310 using the intrusion detection learning parameters and the equipment information collected by the collection unit 354.

The generation unit 364 has a function of generating an updated intrusion detection learning parameter in conjunction with execution of the simulation execution process.

(Control Flow)

An example of the flow of processing until the application program 320 is installed in the present embodiment will be described with reference to the sequence diagrams of FIGS. 6 and 7.

Figure 6:
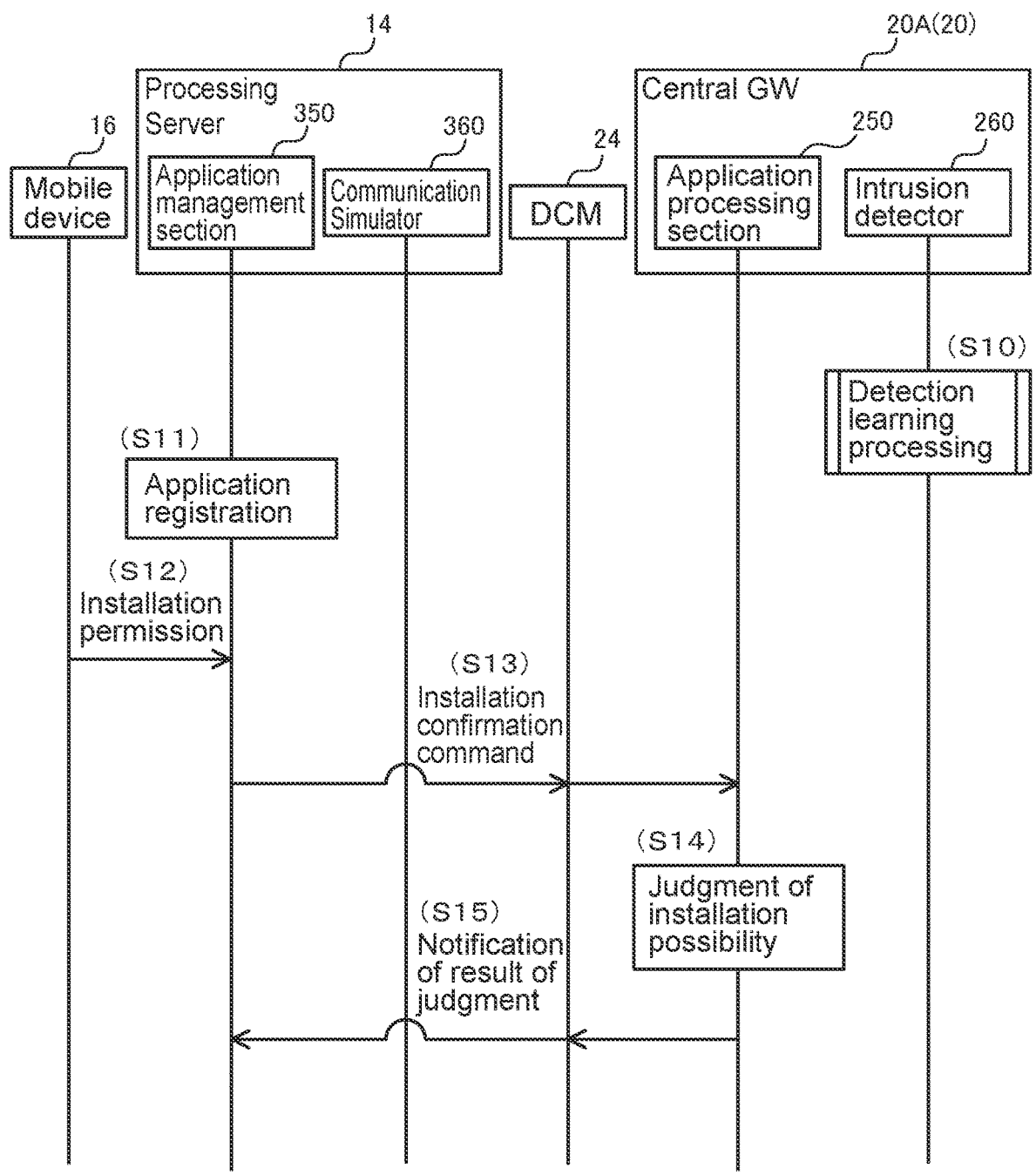
FIG. 6 is a sequence diagram showing a flow of processing until the application program is distributed from the processing server to the central GW in the first embodiment.

In step S10 of FIG. 6, in the central GW 20A, the CPU 201 executes detection learning processing as a function of the intrusion detector 260. That is, the CPU 201 monitors whether there is any unauthorized access to the communication I/F 205. Details of the detection learning processing will be described later.

In step S11, in the processing server 14, the CPU 141 executes registration of the application program 320 as a function of the application management section 350. That is, the application program 320 to be installed at the central GW 20A is stored in the storage 144 in advance.

In step S12, the user who wishes to use the service in the vehicle 12 permits installation of the application program 320 related to the service via the mobile device 16 owned by the user. For example, the user operates the touch panel of the mobile device 16 to permit installation of the application program 320 relative to the central GW 20A. Thereby, the mobile device 16 transmits a command relating to the installation permission to the application management section 350 of the processing server 14. The permission of the user to install the application program 320 is not limited to the method using the mobile device 16, but may be obtained via a car navigation device or a vehicle diagnostic device 18 installed at the vehicle 12.

In step S13, in the processing server 14, as an application management section 350 function, the CPU 141 transmits an installation confirmation command to the application processing section 250 of the central GW 20A. The installation confirmation command is transmitted from the processing server 14 to the central GW 20A via the DCM 24.

In step S14, in the central GW 20A, as a function of the application processing section 250, the CPU 201 determines whether or not installation is possible. In this determination, the CPU 201 checks the free space etc. of the ROM 202 where the application program 320 is to be installed.

In step S15, in the central GW 20A, as a function of the application processing section 250, the CPU 201 notifies the result of the determination as to whether or not installation is possible. The result notification is transmitted from the central GW 20A to the processing server 14 via the DCM 24.

Next, the flow of the detection learning processing in step S10 will be described with reference to the flowchart in FIG. 7.

Figure 7:
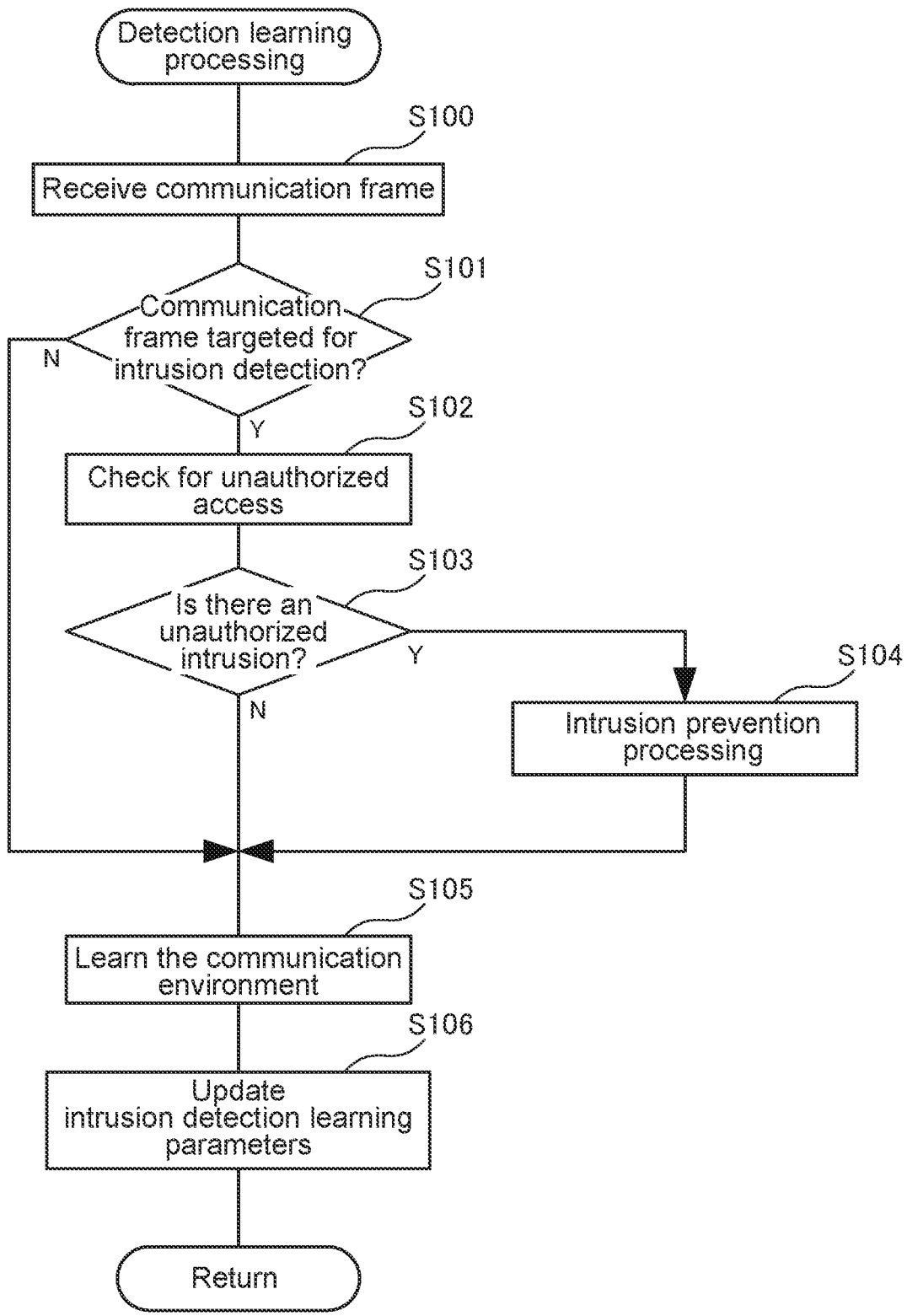
FIG. 7 is a flowchart showing the flow of the detection learning processing according to the first embodiment.

In step S100 in FIG. 7, the CPU 201 receives a communication frame. For example, the CPU 201 receives a communication frame transmitted from a server of a manufacturer of the vehicle 12 and including data relating to use or improvement of optional equipment of the vehicle 12.

In step S101, the CPU 201 determines whether or not the received communication frame is a communication frame targeted for intrusion detection. When the CPU 201 determines that the received communication frame is a target of intrusion detection, the process proceeds to step S102. On the other hand, when the CPU 201 determines that the received communication frame is not the target of intrusion detection, the process proceeds to step S105.

In step S102, the CPU 201 checks whether there is any unauthorized intrusion. Specifically, the CPU 201 refers to the intrusion detection rule defined by the intrusion detection learning parameter, and confirms whether there is any unauthorized intrusion. If there is a communication frame that deviates from the intrusion detection rule, the CPU 201 determines that the communication frame is an unauthorized communication frame, and determines that an unauthorized intrusion has occurred.

In step S103, the CPU 201 determines whether there has been an unauthorized intrusion. If the CPU 201 determines that there has been unauthorized intrusion, the process proceeds to step S104. On the other hand, if the CPU 201 determines that there has been no unauthorized intrusion, the process proceeds to step S105.

In step S104, the CPU 201 executes an intrusion countermeasure process. In the intrusion prevention process, the illegal communication frame is saved as intrusion detection data, which is referenced in FIG. 9, the processing server 14 is notified that an unauthorized intrusion has occurred, and the unauthorized communication frame is isolated from the intrusion detector 260.

In step S105, the CPU 201 learns the communication environment based on the received communication frame. For example, when the communication environment in the network N is changed, information on a new communication environment is obtained. Also, when there is a change in an element that is not defined in the intrusion detection learning parameter, for example, when the reception cycle of the data table is set as the intrusion detection rule, and when a data table that is not related to the reception cycle is added, the changed information is acquired and learned. When a data table that is not related to the reception cycle is added, a data table related to date and time information or position information that has not previously been in a communication frame may be added, for example.

In step S106, the CPU 201 updates the intrusion detection learning parameter based on the learned information. At this time, the updated intrusion detection learning parameters are stored in the secure storage 204. Then, the detection learning process ends.

Next, the flow of the process of distributing the application program 320 when the application program 320 can be installed as a result of the determination in step S14 will be described with reference to the sequence diagram of FIG. 8.

When installing the application program 320 that affects communication, the following processing is executed.

In step S20, in the processing server 14, as a function of the application management section 350, the CPU 141 requests the central GW 20A for intrusion detection data. The request for the intrusion detection data corresponds to a request for installing the application program 320. Information relating to the request for intrusion detection data is transmitted to the intrusion detector 260 via the DCM 24 and the application processing section 250.

In step S21, in the central GW 20A, the CPU 201 performs a process of acquiring intrusion detection data as a function of the intrusion detector 260. That is, the CPU 201 acquires intrusion detection data from the secure storage 204. As shown in FIG. 9, the intrusion detection data is a table including data relating to the intrusion detection learning parameters.

In step S22, in the central GW 20A, the CPU 201 provides intrusion detection data to the processing server 14 as a function of the intrusion detector 260. The intrusion detection data is transmitted to the processing server 14 via the application processing section 250 and the DCM 24.

In step S23, in the processing server 14, as a function of the application management section 350, the CPU 141 issues a simulation execution request to the communication simulator 360.

In step S24, in the processing server 14, the CPU 141 executes a simulation execution process as a function of the communication simulator 360. Through the simulation execution processing, difference data that is an updated intrusion detection learning parameter is generated. Details of the simulation execution processing will be described later.

In step S25, in the processing server 14, as a function of the communication simulator 360, the CPU 141 notifies the application management section 350 of the updated intrusion detection learning parameter.

In step S26, in the processing server 14, as a function of the application management section 350, the CPU 141 provides the application program 320 and the updated intrusion detection learning parameters to the central GW 20A. The application program 320 and the updated intrusion detection learning parameters are transmitted to the central GW 20A via the DCM 24. These may be transmitted as one package or may be transmitted as separate data.

In step S27, in the central GW 20A, the CPU 201 executes installation of the application program 320 as a function of the application processing section 250.

In step S28, in the central GW 20A, as a function of the application processing section 250, the CPU 201 notifies the body ECU 20B of turning on of the function related to the application program 320. The example of FIG. 8 is an example in which the application program 320 provides a service using the body ECU 20B and the devices 26 connected thereto, and the functions of other ECUs 20 are turned on depending on the contents of the service.

In step S29, in the body ECU 20B, the CPU 201 notifies the central GW 20A of the operation result of the function. Steps S28 and S29 are processes for confirming the operation of the body ECU 20B before executing the application program 320, and are not mandatory processes. For example, if the CPU 201 executes only step S28 to turn on the function of the body ECU 20B, it is not always necessary to execute step S29 and receive a result notification. Further, for example, when the application program 320 is executed in step S35, to be described later, the processing in steps S28 and S29 may be executed first.

In step S30, in the central GW 20A, the CPU 201 confirms the installation state of the application program 320 as a function of the application processing section 250.

If it is determined in step S30 that the application program 320 has been installed normally, the process proceeds to the subsequent steps.

In step S31, in the central GW 20A, the CPU 201 provides the intrusion detector 260 with updated intrusion detection learning parameters as a function of the application processing section 250.

In step S32, in the central GW 20A, the CPU 201 executes update processing as a function of the intrusion detector 260. In the update processing, the difference data included in the updated intrusion detection learning parameter is applied to the existing intrusion detection learning parameter stored in the storage 204 and updated. The updated intrusion detection learning parameters are stored in the storage 204.

In step S33, in the central GW 20A, as a function of the intrusion detector 260, the CPU 201 notifies the application processing unit 250 of the update result of the intrusion detection learning parameter.

In step S34, in the central GW 20A, the CPU 201 provides notification of the installation state of the application program 320 and of the update result of the intrusion detection learning parameter as a function of the application processing section 250.

In step S35, in the central GW 20A, the CPU 201 executes the application program 320 as a function of the application processing section 250 and the execution unit 258. Specifically, the CPU 201 requests necessary information from the body ECU 20B whose function has been turned on in step S28, and receives information delivered from the body ECU 20B. For example, in the case of an application program 320 that acquires the traveling distance of the vehicle 12, the CPU 201 requests information on the traveling distance from the body ECU 20B and acquires the information on the traveling distance from the body ECU 20B.

Next, the flow of the simulation execution process in step S24 will be described with reference to the flowchart in FIG. 10.

Figure 10:
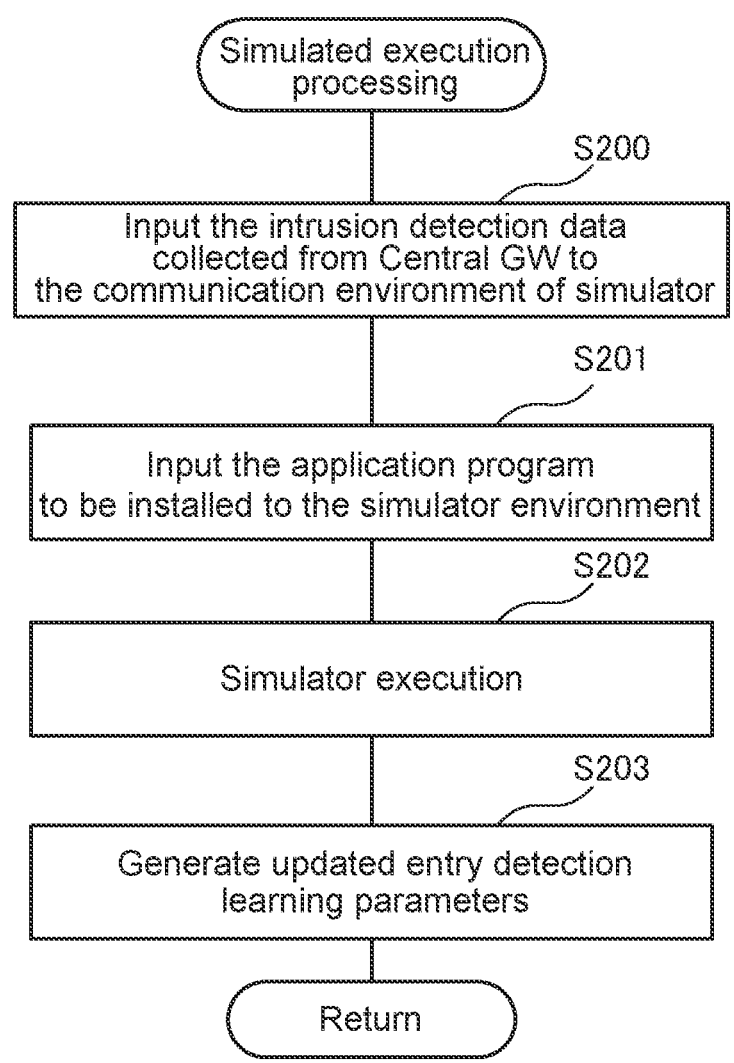
FIG. 10 is a flowchart showing the flow of simulation execution processing according to the first embodiment.

In step S200 in FIG. 10, the CPU 141 starts the simulator by executing the simulation program 310, and inputs intrusion detection data collected from the central GW 20A to the communication environment of the simulator. Thereby, the intrusion detection learning parameter and the intrusion detection rule defined therein are input.

In step S201, the CPU 141 inputs the application program 320, which is to be installed, into the simulator.

In step S202, the CPU 141 executes a simulation with the simulator. At the simulator, simulation is executed of not only the communication state of the application program 320 but also of the behavior of the ECU 20, the operation of the devices 26, and the like. The execution of the simulator is continued until the learning of the intrusion detection learning parameter included in the intrusion detection data is sufficiently performed.

In step S202, the CPU 141 generates an updated intrusion detection learning parameter. The updated intrusion detection learning parameter does not need to include all the specified rules, and is generated as difference data in the present embodiment. Then, the simulation execution processing ends.

Summary of First Embodiment

The vehicle network system 10 of the present embodiment is applied when a user who wants to use a service in the vehicle 12 installs the application program 320 related to the service in the central GW 20A mounted on the vehicle 12. For example, it is assumed that an insurance company provides a service that carefully sets an insurance rate according to mileage. In this case, in order for the insurance company to periodically acquire the mileage from the vehicle 12, the user permits the installation of the mileage acquisition application program 320 at the central GW 20A.

When the application program 320 is installed and executed in the central GW 20A, the central GW 20A can receive, for example, a communication frame related to mileage from the body ECU 20B. Here, in the central GW 20A, the installation of the application program 320 changes the communication environment in order to newly receive a communication frame related to mileage. Therefore, unless the intrusion detection rule defined in the intrusion detection learning parameter is updated so that the communication of the communication frame relating to the traveling distance is permitted, the communication frame is detected as an unauthorized communication frame.

Here, if the processing server 14 provides an intrusion detection rule that permits communication of a new communication frame, illegal detection can be avoided. However, since the presence or absence of the optional equipment differs for each vehicle, the communication frame transmitted is not uniform, and the intrusion detection learning parameters are unique to the vehicle. If all combinations of the intrusion detection learning parameters were to be held, in consideration of the number of vehicles sold, an enormous resource would be required in the storage 144 of the processing server 14.

Therefore, in the present embodiment, the following processing is executed when the application program 320 is installed. The central GW 20A notifies the processing server 14, that is the provider of the application program 320, of the intrusion detection learning parameter for the communication frame and the equipment information relating to the optional equipment of the vehicle 12. On the other hand, the processing server 14 generates an intrusion detection learning parameter adapted to a new communication environment based on the collected intrusion detection learning parameters and equipment information, and provides this to the central GW 20A.

As described above, according to the present embodiment, even if the communication environment in the vehicle 12 is changed due to the installation of the application program 320, it is possible to suppress the malfunction of the intrusion detection. Further, since an intrusion detection learning parameter updated based on the intrusion detection learning parameter and the equipment information collected from the central GW 20A is generated, an increase in resources in the storage 144 of the processing server 14 is suppressed. That is, an increase in cost can be suppressed.

In the central GW 20A of the present embodiment, the application program 320 is executed after updating the intrusion detection learning parameter. Therefore, it is possible to determine that the communication frame that changes due to the execution of the application program 320 by the central GW 20A is appropriate based on the updated intrusion detection learning parameter.

In the present embodiment, the updated intrusion detection learning parameter is generated as difference data. That is, it is not necessary to include all intrusion detection rules, and it is sufficient to prepare intrusion detection rules that have been added, deleted, or changed. Therefore, the communication amount between the processing server 14 and the central GW 20A can be reduced, and the update process referenced in step S32 can be completed quickly at the central GW 20A.

Second Embodiment

In the first embodiment, the processing server 14 and the central GW 20A communicate via the DCM 24. On the other hand, in the second embodiment, communication between the processing server 14 and the central GW 20A can be performed through the vehicle diagnostic device 18 connected to the central GW 20A.

According to this embodiment, the same action and effect as those of the first embodiment can be obtained.

[Notes]

In each of the above embodiments, the simulation is performed by the simulation execution process when the application program 320 is installed. However, the present invention is not limited to this. For example, when the application program 320 related to the previously installed application program is installed, or when the influence after the installation such as a change state of the communication environment is known, the simulation execution process may be omitted.

Further, the application program 320 of each embodiment is installed and executed in the central GW 20A, but it is not limited thereto, and may be configured to be installed and executed in another ECU 20. For example, the application program 320 may be installed in the body ECU 20B. In this case, the body ECU 20B executes the application program 320 by receiving an execution instruction from the execution unit 258 of the central GW 20A.

In the central GW 20A of each embodiment, the function of the application processing section 250 and the function of the intrusion detector 260 are realized by the same CPU 201. However, the present invention is not limited to this, and the respective functions may be realized by different CPUs. In the processing server 14 of each embodiment, the function of the application management section 350 and the function of the communication simulator 360 are realized by the same CPU 141, but it is not limited to this, and each function may be realized by a separate CPU.

In the above-described embodiment, various processors other than the CPUs may execute the various processes performed by the CPU 201 reading and executing the software including the program and the various processes executed by the CPU 141 reading and executing the software including the program. Examples of such processors include programmable logic devices (PLD) with circuit configurations that are reconfigurable after manufacture, such as field-programmable gate arrays (FPGA), and dedicated electronic circuits that are processors including circuit configurations custom designed to execute specific processing, such as application specific integrated circuits (ASIC). Moreover, each processing may be executed by one of such processors, or may be executed by a combination of two or more processors of the same type or different types (for example, plural FPGAs, or a combination of a CPU and an FPGA). More specific examples of hardware structures of such processors include electric circuits configured by combining circuit elements, such as semiconductor devices.

In the exemplary embodiments described above, explanation has been given in which the respective programs are provided in a format pre-stored or installed on a non-transient computer-readable recording medium. For example, in central GW 20A of vehicle 12, execution program 220 is stored in ROM 202 in advance. Moreover, the processing program 300 of the processing server 14 is pre-stored in the storage 144. However, there is no limitation thereof, and the respective programs may be provided in a format stored on a non-transient recording medium such as Compact Disc Read Only Memory (CD-ROM), Digital Versatile Disc Read Only Memory (DVD-ROM), or Universal Serial Bus (USB) memory. Moreover, each of the programs may be provided in a format for downloading from an external device over a network.

The processing flows described in the above exemplary embodiment are merely examples thereof, and unnecessary steps may be omitted, new steps added, or the processing sequence changed within a range not departing from the spirit thereof.

What is claimed is:

1. An in-vehicle control device comprising:
a vehicle-side communication device that is installed on a vehicle and that is configured to perform communication with at least an information processing device external to the vehicle; and
a first processor configured to:
receive a communication frame,
determine whether there is an unauthorized intrusion from outside the vehicle-side communication device based on the communication frame and a first rule,
in response to determining that there is the unauthorized intrusion, execute intrusion prevention processing by isolating the communication frame,
notify the information processing device of the first rule and equipment information of the vehicle,
acquire an application program and a second rule that has been updated based on the notified first rule and the equipment information from the information processing device, and
update the first rule to the updated second rule.

2. The in-vehicle control device of claim 1, wherein:
the vehicle-side communication device performs the communication with the information processing device in accordance with a controller area network (CAN) protocol, and
the first rule comprises an order of data frames based on an identifier for communication arbitration in the CAN protocol.

3. The in-vehicle control device of claim 1, wherein:
the updated second rule is acquired as difference data which does not include the first rule, thereby reducing a communication amount between the in-vehicle control device and the information processing device.

4. A vehicle network system comprising:
an in-vehicle control device comprising:
a vehicle-side communication device that is installed on a vehicle and that is configured to perform communication with at least an information processing device external to the vehicle, and
a first processor configured to:
receive a communication frame,
determine whether there is an unauthorized intrusion from outside the vehicle-side communication device based on the communication frame and a first rule,
in response to determining that there is the unauthorized intrusion, execute intrusion prevention processing by isolating the communication frame,
notify the information processing device of the first rule and equipment information of the vehicle,
acquire an application program and a second rule that has been updated based on the notified first rule and the equipment information from the information processing device, and
update the first rule to the updated second rule; and
the information processing device configured to perform the communication with the vehicle-side communication device, the information processing device comprising a second processor configured to:
collect the first rule and the equipment information from the in-vehicle control device,
generate the second rule that has been updated based on the collected first rule and the equipment information, and
provide the application program and the generated updated second rule to the in-vehicle control device.

5. The vehicle network system of claim 4, wherein the first processor is configured to execute the application program after performing the update to the updated second rule.

6. The vehicle network system of claim 4, wherein:
the updated second rule is acquired as difference data which does not include the first rule, thereby reducing a communication amount between the in-vehicle control device and the information processing device.

7. A method of providing an application program to an in-vehicle control device installed on a vehicle from an information processing device external to the vehicle, the method comprising:
receiving, by the in-vehicle control device, a communication frame;
determining, by the in-vehicle control device, whether there is an unauthorized intrusion from outside the in-vehicle control device based on the communication frame and a first rule;
in response to determining that there is the unauthorized intrusion, executing, by the in-vehicle control device, intrusion prevention processing by isolating the communication frame;
notifying, by the in-vehicle control device, the information processing device of the first rule and equipment information of the vehicle;
generating, by the information processing device, an updated second rule based on the first rule and the equipment information acquired by the information processing device;
providing, by the information processing device to the in-vehicle control device, an application program and the updated second rule; and
updating, by the in-vehicle control device, the first rule to the updated second rule.

8. The method of claim 7, wherein:
the updated second rule is acquired as difference data which does not include the first rule, thereby reducing a communication amount between the in-vehicle control device and the information processing device.

9. A non-transitory storage medium storing a program for causing a computer of an in-vehicle control device, installed on a vehicle and performing communication with at least an information processing device external to the vehicle, to execute:
receiving a communication frame;
determining whether there is an unauthorized intrusion from outside the in-vehicle control device based on the communication frame and a first rule;
in response to determining that there is the unauthorized intrusion, executing intrusion prevention processing by isolating the communication frame;
notifying the information processing device of the first rule and equipment information of the vehicle;
acquiring an application program and a second rule that has been updated based on the notified first rule and the equipment information from the information processing device; and
updating the first rule to the updated second rule.

10. The non-transitory storage medium of claim 9, wherein:
the updated second rule is acquired as difference data which does not include the first rule, thereby reducing a communication amount between the in-vehicle control device and the information processing device.

\* \* \* \* \*